United States Patent
Brochot et al.

(10) Patent No.: US 10,414,078 B2
(45) Date of Patent: Sep. 17, 2019

(54) METHOD FOR MANUFACTURING A LIGHTENED TOOTHED WHEEL BY DOUBLE OVERMOULDING

(71) Applicant: JTEKT EUROPE, Irigny (FR)

(72) Inventors: Patrice Brochot, Oullins (FR); Laurent Rey, Villeurbanne (FR)

(73) Assignee: JTEKT EUROPE, Irigny (FR)

( * ) Notice: Subject to any disclaimer, the term of this patent is extended or adjusted under 35 U.S.C. 154(b) by 444 days.

(21) Appl. No.: 15/302,055

(22) PCT Filed: Apr. 23, 2015

(86) PCT No.: PCT/FR2015/051110
§ 371 (c)(1),
(2) Date: Nov. 16, 2016

(87) PCT Pub. No.: WO2015/162388
PCT Pub. Date: Oct. 29, 2015

(65) Prior Publication Data
US 2017/0120487 A1    May 4, 2017

(30) Foreign Application Priority Data
Apr. 24, 2014 (FR) ..................................... 14 53702

(51) Int. Cl.
*B29C 45/14* (2006.01)
*B29C 45/16* (2006.01)
(Continued)

(52) U.S. Cl.
CPC .......... *B29C 45/1459* (2013.01); *B29B 11/14* (2013.01); *B29C 45/0005* (2013.01);
(Continued)

(58) Field of Classification Search
CPC .................................................. B29C 45/1459
See application file for complete search history.

(56) References Cited

U.S. PATENT DOCUMENTS

2010/0052412 A1   3/2010   Morris

FOREIGN PATENT DOCUMENTS

| DE | 10 2012 102777 A1 | 10/2013 |
|----|---|---|
| DE | 10 2012 102780 A1 | 10/2013 |

(Continued)

OTHER PUBLICATIONS

Jul. 10, 2015 International Search Report issued in International Patent Application No. PCT/FR2015/051110.

*Primary Examiner* — Timothy Kennedy
(74) *Attorney, Agent, or Firm* — Oliff PLC

(57) ABSTRACT

The invention relates to a method for producing a gear, said method including a step (a) during which a supporting core is made from a first polymer material, said supporting core comprising a hub, with a director axis (XX'), as well as a flange which extends radially from said hub to a peripheral flanged edge, said method then involves a coating step (b) which comprises producing a permanent coating layer, made of a second polymer material, by overmolding on the supporting core, including integrally both a front layer which covers the upper surface of the flange, and a side layer which extends said front layer axially by covering the outer radial surface of the flanged edge, such that said side layer forms a rim, the teeth of the gear being made in the radial body of said rim.

9 Claims, 4 Drawing Sheets

(51) Int. Cl.
*B29C 45/00* (2006.01)
*F16H 55/06* (2006.01)
*B29B 11/14* (2006.01)
*B29L 15/00* (2006.01)

(52) U.S. Cl.
CPC ........ *B29C 45/14311* (2013.01); *B29C 45/16* (2013.01); *F16H 55/06* (2013.01); *B29C 2045/1692* (2013.01); *B29L 2015/003* (2013.01); *B29L 2015/006* (2013.01); *F16H 2055/065* (2013.01)

(56) References Cited

FOREIGN PATENT DOCUMENTS

| | | | |
|---|---|---|---|
| EP | 1 780 445 A1 | 5/2007 | |
| JP | S55-41273 A | 3/1980 | |
| JP | H09-280345 A | 10/1997 | |

METHOD FOR MANUFACTURING A LIGHTENED TOOTHED WHEEL BY DOUBLE OVERMOULDING

The present invention concerns the general field of manufacturing wheels intended to ensure the transmission of a torque within a mechanism, and more particularly the field of manufacturing toothed wheels intended to gear-type mechanisms.

More particularly, the present invention concerns the manufacture of toothed wheels intended to power steering reducers for motor vehicles.

There is known, in particular by the document US-2010/0201030, a method for manufacturing toothed wheels during which a metallic hub and a toothed wheel rim are placed in a mold, and then the hub is linked to the wheel rim by forming therebetween, by molding, an intermediate disc made of a plastic material.

Nonetheless, such a method may sometimes present some drawbacks.

First of all, the use of a metallic hub, often with relatively significant dimensions, tends to make heavy the toothed wheel obtained accordingly.

Then, such a method imposes positioning the wheel rim very accurately with respect to the hub, while molding the intermediate disc. In practice, any failure in positioning the parts, or any uncontrolled displacement of a part relative to the other during molding operation due to the pressure of the injected plastic, may result in a significant defect in concentricity of the teeth of the wheel with respect to the axis of rotation of said wheel, which may compromise the proper operation of the toothed wheel (noise, wear . . . ), or even cause scrapping said toothed wheel.

Furthermore, such a method requires that the wheel rim and/or the hub present relatively complex shapes, intended to improve the gripping of the intermediate disc, which may in practice complicate the prior manufacture of the hub and/or the wheel rim, and therefore increase the cost thereof.

Finally, it is systematically necessary to proceed, after molding, to a rework of the wheel by machining, in particular in order to eliminate the solidified remainders of the (conical) sprues, which increases the manufacturing time and tends to cause some waste of raw material.

Consequently, the objects assigned to the invention aim to overcome the aforementioned drawbacks, and to propose a new method for manufacturing toothed wheels which is simple and inexpensive to implement, and which makes it possible to obtain, in a reliable and reproducible way, toothed wheels which are both light and robust.

The objects assigned to the invention are achieved by means of a method for manufacturing a toothed wheel, said method comprising a step (a) for realizing a carrier core, during which a carrier core is made of a first polymer material, said carrier core including a hub, having a main axis (XX'), as well as a collar which extends, substantially radially from said hub, away from the main axis (XX'), up to a peripheral flanged edge, said collar being delimited axially by a surface called «upper» surface orientated on the axially opposite side of the flanged edge, and by a surface called «lower» surface axially orientated on the flanged edge side, said method then comprising a coating step (b) during which is carried out by overmolding on the carrier core, in a second polymer material, a permanent coating layer which remains permanently on the completed toothed wheel, said coating layer comprising in one piece, on the one hand, a frontal layer which covers the upper surface of the collar as an axial over-thickness of said collar and, on the other hand, a lateral layer which axially extends said frontal layer by covering the radially outer surface of the flanged edge, as a radial over-thickness of said flanged edge, so that said lateral layer forms a wheel rim in the radial thickness of which the meshing teeth of the wheel are realized.

Advantageously, the use of polymer materials simplifies the manufacture of the carrier core and the coating layer, by allowing, if appropriate, a manufacture by molding or, more particularly, a manufacture through a sequence of overmolding operations.

Furthermore, the use of polymer materials makes globally the toothed wheel lighter, in comparison with a wheel with a metallic structure.

Advantageously, the coating layer according to the invention further forms a one-piece shell which adheres to the carrier core and wraps said carrier core in several directions, both axially, by spreading transversely to the main axis (XX'), on the upper surface of the collar, and radially, by spreading substantially parallel to said main axis (XX'), on the flanged edge, which allows obtaining an excellent anchorage of the coating layer on the carrier core, and consequently an excellent cohesion of the thus obtained mixed structure, herein a dual layer, structure, which is definitively preserved in order to guarantee a durable good resistance of the toothed wheel during operation, against the torques transmitted about the main axis (XX') as well as the possible axial pull-out forces.

Advantageously, by covering the carrier core with a wide coating layer, which covers both the peripheral wheel rim of the toothed wheel and the radially intermediate portion of said toothed wheel, comprised between the hub and said wheel rim, and which therefore correspond to the "radii" of the toothed wheel, the structure of the carrier core is reinforced and rigidified effectively in its entirety, while using a relatively small amount of material.

In this respect, it will be noted that thanks, on the one hand, to the generally convex structure of the toothed wheel, which has a shell-shape like a hollow dome (centered on the generating axis) or a "bell", and which is obtained thanks to the profile of the core defined by the collar and the flanged edge placed in the continuity of said collar, and thanks, on the other hand, to a coating layer which substantially conforms to this same profile, an excellent rigidity is conferred to the toothed wheel, even when using relatively thin material thicknesses, for the core as well as for the coating layer.

Advantageously, the toothed wheel according to the invention is therefore both light and raw material efficient, while remaining particularly strong.

Furthermore, the suitable shape of the carrier core allows an effective, progressive and homogenous covering of said core by the second polymer material, when the latter is in a fluid state and flows over the surface of said core during overmolding.

Hence, the manufacture of the coating layer is particularly simple and reliable.

Furthermore, the quality of the flow and the quality of the material distribution achieved by the arrangement proposed by the invention makes it possible to notably make use of a (flat) ring gate overmolding process, with central injection in the axis of the carrier core, thereby using very little residual material for the sprue.

Thus, raw material is saved, while also significantly reducing the finishing, re-machining operations.

Finally, the proposed manufacturing method, which allows easily realizing a homogenous wheel rim with a proper radial thickness around the flanged edge, in a particularly resistant (second) material, is particularly suitable for implementing a gear cutting operation of the meshing teeth of the wheel which is subsequent to the molding operations, and preferably subsequent to fastening of the wheel on the shaft thereof, thus making free from any defect in concentricity between the effective pitch diameter of the teeth and the material axis of rotation of the toothed wheel.

Other objects, features and advantages of the invention will appear in more detail upon reading the description that follows, as well as with reference to the appended drawings, provided only for an illustrative and non-restrictive purpose, among which:

Figure 15:
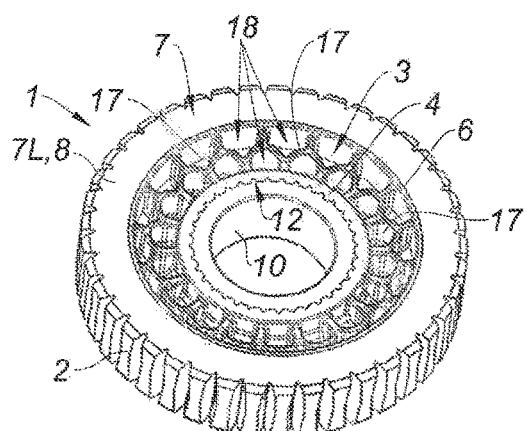
Figure 16:
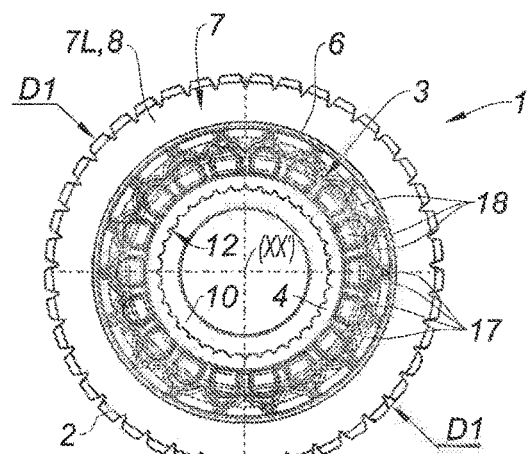

FIGS. 15 and 16, respectively 17 and 18, respectively 19 and 20, illustrate, according to pairs of perspective bottom view and axial bottom projection view, three variants of toothed wheels according to the invention.

The present invention concerns a method for manufacturing a toothed wheel 1.

In particular, said toothed wheel 1 may be a wheel of a gear reducer, and more particularly a wheel of a reducer for a power steering, and may form for example a worm wheel intended to be driven by a worm screw.

The toothed wheel may present any type of meshing teeth 2, forming for example spur teeth (as illustrated, in a non-restrictive way, in FIGS. 7 to 9, 15 and 16), helical teeth (as illustrated, in a non-restrictive way, in FIGS. 17 to 20), or herringbone teeth.

Figure 2:
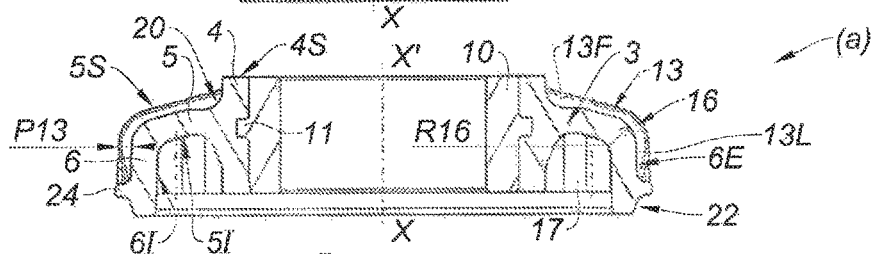

First of all, the method comprises a carrier core realization step (a), comprising making a carrier core 3 in a first polymer material, as illustrated in FIG. 2.

According to the invention, and as illustrated in particular in FIGS. 1 to 6, 8, 11, 12 and 13, said carrier core 3 includes a hub 4, with a main axis (XX'), as well as a collar 5 which extends substantially radially from said hub, away from the main axis (XX'), up to a peripheral flanged edge 6.

In practice, the main axis (XX') corresponds to the axis of rotation of the toothed wheel 1, and is advantageously shared by the different constitutive elements of said wheel.

For the convenience of the description, it will be referred by «axial» to a direction or a dimension considered along said main axis (XX') or parallel to the latter, and by «radial» to a direction or a dimension considered transversely, and more particularly perpendicularly, to said main axis (XX').

Conventionally, the collar 5 will be considered to be delimited axially by a surface called «upper» surface 5S orientated on the side that is axially opposite to the flanged edge 6, and by a surface called «lower» surface 5I axially orientated on the flanged edge 6 side.

In practice, the surface called upper surface 5S will correspond herein to the apparent surface intended to receive a coating layer 7 (while the opposite lower surface 5I is preferably intended to remain in a bare state, without any coating layer), said upper surface 5S being, to this end, axially orientated on the side by which the material arrives (i.e. on the overmolding injector side), whereas the flanged edge 6 "falls" (and is contained) axially set-back with respect to said upper surface 5S.

Figure 8:
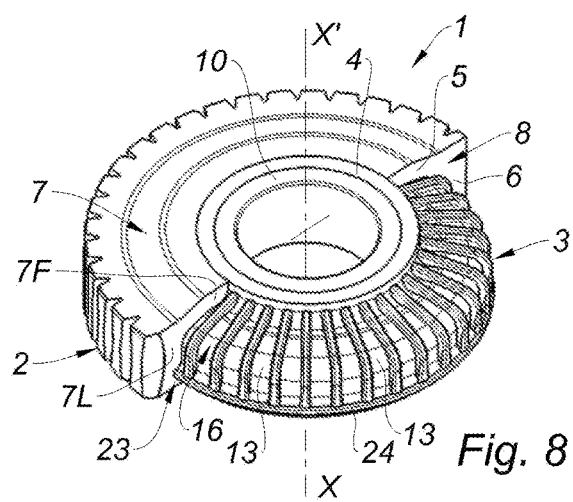
Figure 9:
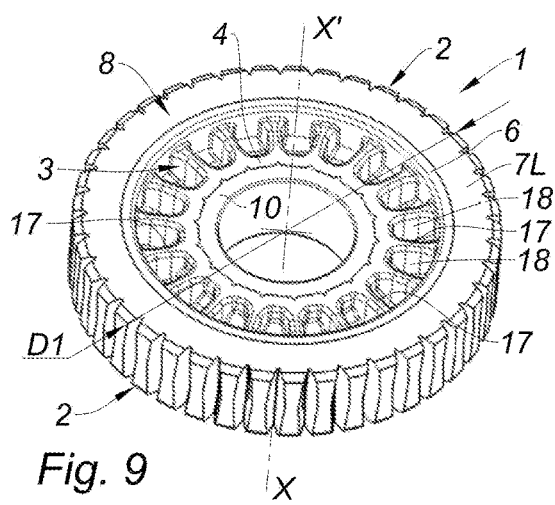
Figure 10:
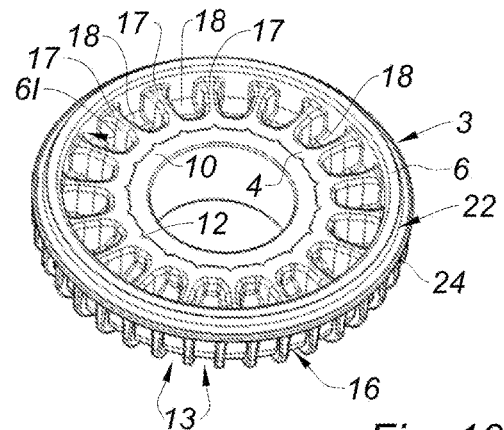
FIGS. 10, 11, 12 and 13 illustrate, according to, respectively, a perspective bottom view, a perspective top view, a cutaway perspective top view, and an axial top projection view, the carrier core of the toothed wheel of FIGS. 1 to 9, mounted on a connecting sleeve.
Figure 11:
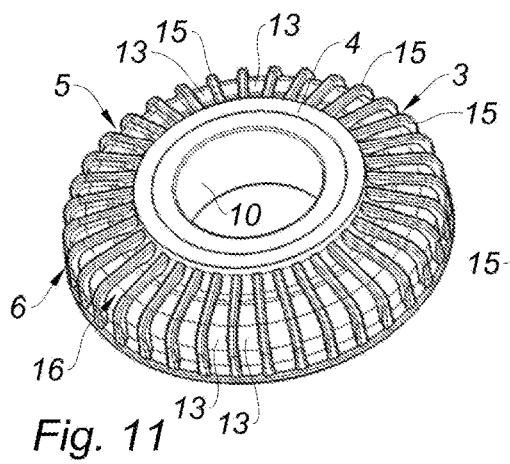
Figure 13:
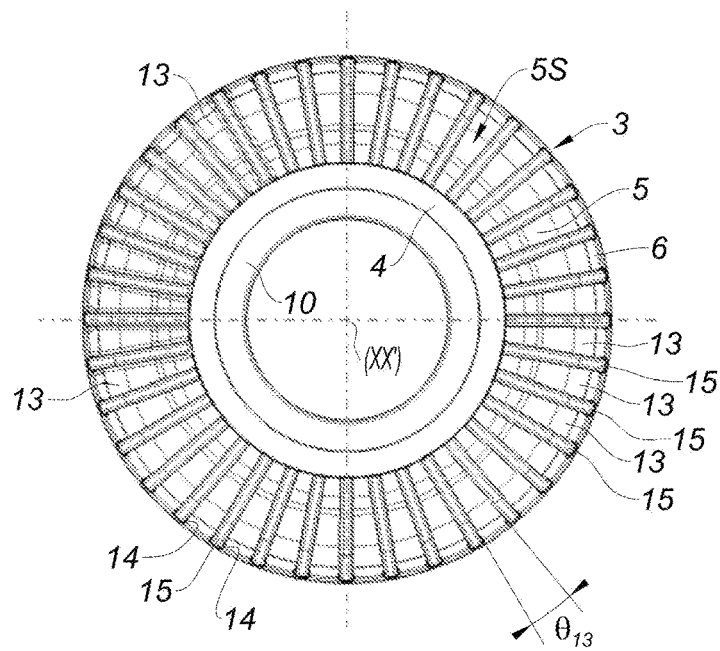

As shown in particular in FIGS. 8, 11 and 13, the (solid) collar 5 surrounds the hub 4 over the entire perimeter of said hub, over 360° around the main axis (XX'), thus serving as radii of the wheel, so as ensure a stable linkage between said hub 4 and the periphery of the toothed wheel 1 forming the wheel rim 8 that carries the meshing teeth 2.

In this respect, it will be noted that the overall diameter D5 of the collar 5, and more generally the overall diameter of the carrier core 3, will preferably be equal to or larger than 50%, 60%, or even 75% of the overall diameter D1 of the completed wheel 1, and preferably smaller than or equal to 90%, or even 85% of said overall diameter D1 of the completed wheel. As an indication, in the provided views, this ratio D5/D1 is in the range of 84%.

Although the invention is not limited to a wheel 1 with particular dimensions, it will be noted that, in particular in the case of a wheel 1 intended to a power steering reducer, the overall diameter D1 of said wheel 1 may be substantially comprised between 3 cm and 20 cm, more particularly between 5 cm and 15 cm, and preferably equal to 10 cm.

Preferably, the hub 4 will extend axially beyond the thickness of the collar 5, in order to ensure a sufficient axial support of the wheel 1 on the shaft thereof.

Preferably, for compactness, said hub 4 will extend at least partially in axial protrusion from the lower surface 5I, inside the volume wrapped by the collar 5 and by the flanged edge 6, as illustrated in FIGS. 2 to 6.

In a particularly preferred manner, the hub 4 will extend (surpass) axially on either side of the collar 5, both in axial protrusion from the upper surface 5S and, in the opposite, in axial protrusion from the lower surface 5I.

Figure 5:
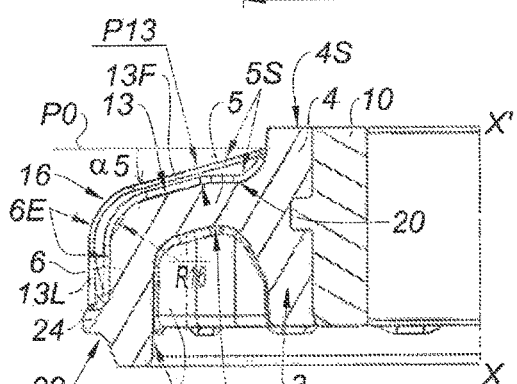
FIGS. 5 and 6 illustrate, according to partial axial sectional views, the carrier core is a bare state and then the carrier core overlaid by the permanent coating layer.

Preferably, the collar 5 extends, and at least starts, from the hub 4, substantially in a plane P0 normal to the main axis (XX'), or, more particularly, as shown in FIG. 5, along a slight slope $\alpha_5$ which progressively makes said collar 5 down toward the flanged edge 6, as it becomes more distant from the main axis (XX').

The slope $\alpha_5$ (the cone) followed by the collar 5, or at least by the upper surface 5S of said collar 5, may be comprised between 5 degrees and 20 degrees, and preferably between 10 degrees and 15 degrees, with respect to the plane P0 normal to the main axis (XX'). As an indication, in FIG. 5, said slope $\alpha_5$ is about 15 degrees.

Such a truncated-cone sloped arrangement will first facilitate the manufacture of the carrier core 3 by molding, in particular by simplifying the drafts, and may further improve afterwards the flow of the second polymer material over the upper surface 5S during the realization of the coating layer 7.

The flanged edge 6, secant to the collar 5, is in turn folded over axially in the continuity of said collar 5, so as to form a cylinder, and more preferably an annular strip, concentric with the hub 4 and radially distant from said hub 4.

Thus, said flanged edge 6, and more particularly the radially outer surface 6E thereof, preferably extends substantially parallel (around +/−5 degrees or +/−10 degrees, for example) to the main axis (XX'), or even exactly parallel to the main axis (XX').

Thus, the set formed by the collar 5 and the flanged edge 6, and more generally the carrier core 3, may advantageously present a revolution shell-type structure, with a convex dome (or bell) shape, that is light, robust and rigid at the same time. Hence, the toothed wheel 1 formed from such a carrier core 3 may benefit from these rigidity and lightness properties.

Figure 3:
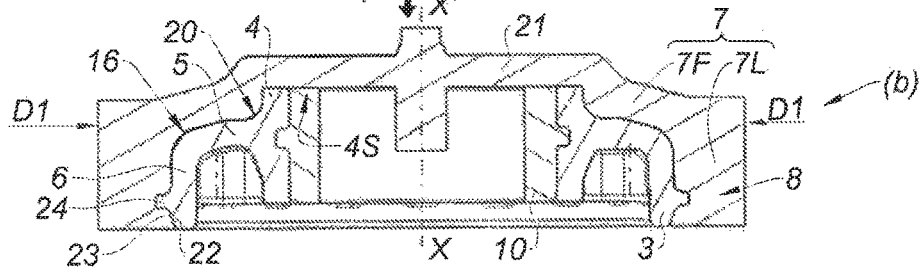

According to the invention, and as illustrated in particular in FIG. 3, the method then comprises, after the carrier core 3 realization step (a), a coating step (b) comprising overmolding on the carrier core 3, in a second polymer material, a permanent coating layer 7 which remains permanently on the completed toothed wheel 1 (that is to say that said coating layer 7 is not removed, or at least not completely removed, by machining after having been formed on the carrier core 3, so as to be kept on the final toothed wheel 1, within which said coating layer 7 fulfills in particular a structure reinforcement function).

Said coating layer 7 (which subsists on the final wheel) comprises in one piece on the one hand a frontal layer 7F (or «upper layer») which covers the upper surface 5S of the collar 5 as an axial over-thickness of said collar 5, and on the other hand a lateral layer 7L which axially extends said frontal layer 7F by covering the radially outer surface 6E of the flanged edge 6, as a radial over-thickness of said flanged edge 6, so that said lateral layer 7L forms a wheel rim 8 in the radial thickness of which the meshing teeth 2 of the wheel 1 are realized.

Advantageously, the addition as an over-thickness on the carrier core 3, by overmolding, and the preservation, within the completed wheel 1, of a coating layer 7 with two contiguous and secant "parts" (substantially forming a «L» shape), namely a frontal layer 7F (forming a first part like a substantially radial disc) and a lateral layer 7L (forming a second part like a substantially axial ring, which further extends the first part), allows obtaining a wheel 1 with a dual layer structure, in which the second layer (the coating layer 7), formed by the second polymer material, reinforces (consolidates) the first layer (the carrier core 3) which is formed by the first polymer material and to which said second coating layer 7 (and therefore said second material) is overlaid, wherein this dual layer structure is present both in the intermediate area corresponding to the "radii" of the wheel (that is to say in the area of the collar 5, from the hub 4 to the flanged edge 6) and in the peripheral area of the wheel rim 8 (in the area of the flanged edge 6).

In this respect, it will be noted that the frontal coating layer 7F preferably covers, around the hub 4 and the main axis (XX'), an annular region the radial extent of which $R_{7F}$ represents at least 25%, at least 30%, and preferably between 40% and 80%, of the total radial extent of the frontal area of the carrier core 3 which is radially comprised between the radially inner wall of the bore of the hub 4 and the radially outer surface 6E of the flanged edge 6.

According to a sizing which may be alternative or substantially equivalent to the sizing mentioned in the previous paragraph, the frontal coating layer 7F may cover, around the hub 4 and the main axis (XX'), overlapping the upper surface 5S of the collar 5, an annular region the radial extent $R_{7F}$ of which (considered between the main axis (XX') and the wheel rim 8) represents at least 5%, at least 10%, at least 20%, and more particularly between 20% and 50%, for example between 25% and 35% of the overall radius (that is to say, half the overall diameter D1/2) of the completed wheel 1.

In a particularly preferred manner, the radial extent $R_{7F}$ of the frontal coating layer 7F will be larger (and preferably several times larger) than the axial thickness $E_{7F}$ of said frontal coating layer 7F, in order to obtain a good base of the coating layer 7 on the carrier core 3 and an effective reinforcement of said carrier core 3 though without increasing too much the bulk and the weight of the wheel 1.

The continuity and the extent of the coating layer 7, which forms a wrapping monolithic over-shell over the carrier core 3, therefore allows obtaining a toothed wheel 1 the structure of which is particularly resistant in any area, both at the periphery and in the intermediate portion of the wheel 1, and this even when using, if appropriate, a carrier core 3 and/or a coating layer 7 which are relatively thin, and therefore particularly light.

In particular, the convex shell-fashioned structure of the coating layer 7 allows reinforcing the adherence of the coating layer 7 on the carrier core, by maximizing the extent of the contact interface between the first and the second polymer materials.

In addition, this same shell-fashioned structure allows for an excellent mechanical anchorage of the coating layer 7 on the carrier core 3, since the frontal layer 7F forms in particular an abutment for immobilizing the coating layer 7 axially against the carrier core 3, and the lateral layer 7L forms an abutment for centering (on the main axis) and for radially immobilizing (transversely to the main axis).

Furthermore, the continuity of the coating layer 7 which covers in one piece the collar 5 and the flanged edge 6 allows conferring to the wheel 1 a neat appearance, with an homogenous finish, devoid of asperities or potential incipient cracks.

Although it is not excluded to form the carrier core 3 and/or the coating layer 7 by means of a first material, respectively a second material, such as a thermosetting resin, in particular by molding, it will be preferable to use a first thermoplastic material, and/or respectively a second thermoplastic material.

Thus, it will be possible to easily make the carrier core 3, and then the coating layer 7, by hot-molding, in particular by injection (over)molding at a pressure higher than the atmospheric pressure.

As an indication, the residual axial thickness $E_{7F}$ of the frontal layer 7F may be comprised between 4 mm and 8 mm, and/or between 4% and 8% of the overall diameter D1 of the completed wheel 1.

As an indication, the (total) radial thickness $E_{7L}$ of the lateral layer 7L, that is to say the thickness of the wheel rim 8 (including the teeth 2) may be comprised between 7 mm and 12 mm, and/or between 7% and 12% of the overall diameter D1 of the completed wheel; if appropriate, the minimum residual radial thickness of the lateral layer 7L at the teeth root may be comprised between 4 mm and 8 mm.

Moreover, the meshing teeth 2 cutting step (wherein the teeth are cut in the thickness of the wheel rim 8) will preferably takes place subsequently to the step (b) of coating by overmolding, and, in a particularly preferred manner, after the wheel 1 has been fastened on the shaft thereof (not represented).

Thus, cutting the teeth 2 after molding the wheel 1, while the effective axis of rotation of the wheel 1 is materialized by the shaft on which said wheel 1 is fastened, so that said shaft forms a reference for the cutting machine, makes it possible to avoid every defect in concentricity between the pitch diameter of the teeth 2 and said effective axis of rotation.

Preferably, the shaft to which the wheel 1 is fastened will comprise teeth, at one end opposite to the end receiving said wheel 1, for example helical teeth, forming a meshing pinion intended for example to engage a power steering column.

Preferably, during the carrier core 3 realization step (a), the hub 4, the collar 5 and the flanged edge 6 are made of one piece.

More generally, the carrier core 3 will preferably be made of one piece, in the first polymer material.

Thus, a particularly strong carrier core will be obtained simply and rapidly.

Figure 1:
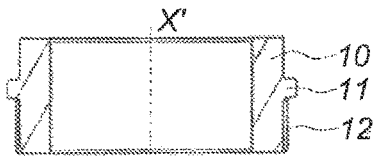
FIGS. 1, 2, 3 and 4 illustrate, according to axial sectional views, the successive steps of a manufacturing method according to the invention.

Preferably, as illustrated in FIGS. 1 and 2, the carrier core 3 will be formed (preferably in one piece) by overmolding on a metallic connecting sleeve 10, that is intended to be press-fitted on a shaft, or directly by overmolding on the final support shaft of the toothed wheel 1 (in practice, for this purpose one may merely substitute, in FIGS. 1 to 6, said shaft, preferably a metallic shaft, for the sleeve 10).

In other terms, the method according to the invention preferably comprises two successive overmolding steps, a first overmolding step (FIG. 2) during which the carrier core 3 is formed by overmolding the first material on the sleeve 10, respectively on the shaft of the wheel 1, and then a second overmolding step (FIG. 3) during which the coating layer 7 is formed by overmolding the second material on the carrier core 3 (for instance, over the said carrier core).

In particular, such a method allows realizing the structure of the wheel 1 rapidly and in a simple manner, with a minimum tooling, because at least one portion of the mold (not represented) used for the first overmolding, for example the lower cavity which allows molding the concave surface of the core 3 opposite to the upper surface 5S, may be reused for the second overmolding.

Furthermore, such a method allows saving energy, because the second overmolding may takes place «while still hot», as soon as the carrier core 3 has solidified, while said carrier core 3, and at least a portion of the mold (the re-used portion), is still hot from the first overmolding operation.

Figure 6:
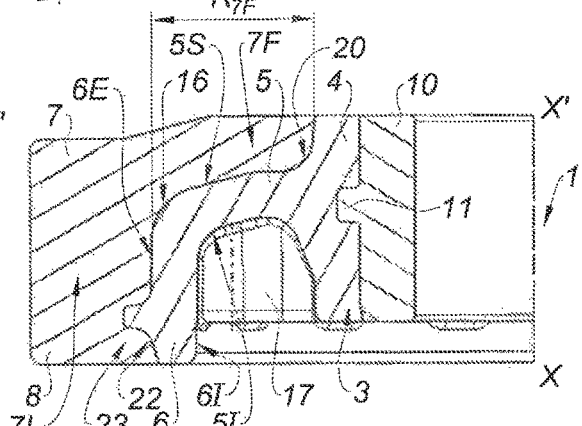
Figure 7:
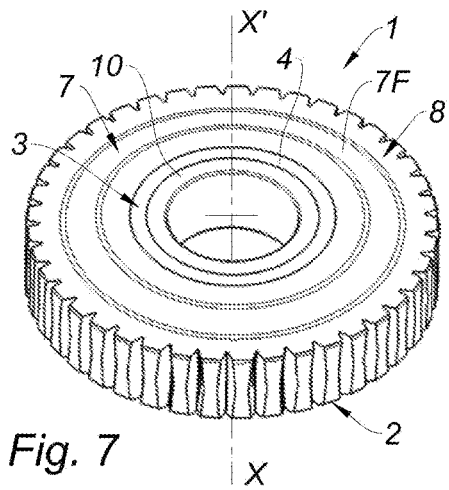
FIGS. 7, 8 and 9 illustrate, according to a perspective top view, a cutaway perspective top view, and a perspective bottom view, the completed toothed wheel of FIG. 4, obtained by a method according to the invention.
Figure 12:
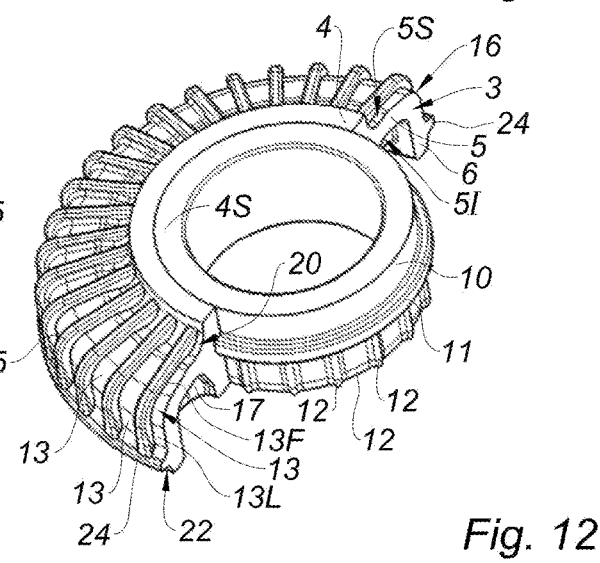

As visible in particular in FIGS. 2, 6 and 12, fastening (by overmolding) of the hub 4 on the sleeve 10, respectively directly on the shaft, may be reinforced by means of gripping shapes 11, 12 provided on the sleeve 10, respectively on the shaft, such as a protruding stop crown 11 (reinforcing the axial strength), and/or radial indentations 12 (reinforcing the resistance to torque), and wherein said gripping shapes will be drowned by the first material constitutive of the hub 4 during the first overmolding step (FIG. 2).

Preferably, the first polymer, preferably thermoplastic, material which is used to form the carrier core 3, is distinct from the second polymer, preferably thermoplastic, material which is used to form the coating layer 7, said first polymer material presenting a higher rigidity than said second polymer material (that is to say, in practice, a higher Young's modulus than the Young's modulus of the second material).

For example, this higher rigidity may be obtained thanks to the addition of reinforcing fibers, for example glass fibers, carbon fibers, aramid fibers, etc., drowned in a polymer matrix, in order to obtain a first composite material.

Of course, once solidified, the first material as well as the second material will be rigid, at ambient temperature and over the entire expectable range of operating temperatures of the wheel 1.

The use of a less rigid (more flexible) second material to form the coating layer 7 will have several advantages.

First of all, such a second material will be easy to machine, which will make cutting the teeth 2 rapid and inexpensive.

Afterwards, once the wheel 1 is formed and implemented within an effort transmitting mechanism, and more particularly within a worm screw reducer, the relative flexibility of the meshing teeth 2 make the latter able to conform to the shape of the threads of the worm screw, thus increasing the number of meshing teeth 2 as well as the contact surfaces under heavy load. This relative flexibility will also allow distributing and diffusing the load over a wider portion of the carrier core 3 and therefore avoiding the apparition of high local stresses, likely to be at the origin of breakages.

Thus, this will improve the operation and the longevity of the wheel 1.

The use of a more rigid first material, and more particularly a fiber-reinforced first material, to form the carrier core 3, will advantageously allow limiting the deformation under load of said core 3, and therefore, more generally, of the structure of the wheel 1.

Furthermore, the use of reinforcing fibers will allow making said carrier core 3, and more generally the wheel 1, less sensitive to thermal expansion phenomena, and will confer to said carrier core 3, which forms the most mechanically stressed portion of the obtained dual-material wheel 1, a better resistance to ageing by mechanical, thermal and chemical (by the lubricants used in the mechanism) fatigue, and consequently a better longevity.

Advantageously, by creating and by fashioning at a lower cost a coating layer 7 in a second material more flexible than the first one, while consolidating by this same coating layer 7 (by the addition of thickness) the carrier core 3 which supports said coating layer 7 and which, in turn, is already particularly rigid and solid, the invention allows obtaining ultimately a dual-material toothed wheel 1 which combines robustness, low manufacturing cost, and operation quality.

Moreover, although the first material and the second material preferably present distinct compositions, and therefore, distinct mechanical properties, they preferably have some chemical affinity (compatibility) to each other, and if appropriate quite close glass transition temperatures, so as to be able to link one to the other by adherence, and more particularly so as to enable one to be fastened to the other by superficial re-melting the first material (of the core 3) during the injection of the second material (of the coating layer 7).

As an indication, it is possible to use a first composite material comprising a polymer matrix with the same composition as the second material but containing, unlike said second material, reinforcing fibers or, if the second material in turn is a composite containing reinforcing fibers, a first material containing a higher concentration of reinforcing fibers, or another kind of reinforcing fibers other than the fibers of the first material.

As example, it is possible to choose a polyamide PA66 fiber-reinforced to 50% with glass fibers as a first material (to form the core 3), and a polyamide PA66 as a second material (to form the coating layer 7).

Regardless of the composition of the second material constitutive of the coating layer 7, and because said coating layer 7 is advantageously placed in the apparent areas of the wheel, in particular at the wheel rim 8, which are the most exposed to the external elements, the coating layer 7 will always assume a kind of protective function of the core 3, and more generally of the wheel 1, in the same manner as a shield, and will therefore improve the mechanical strength and the longevity of said wheel 1.

Preferably, and according to a feature which may constitute an invention on its own, during the carrier core 3 realization step (a), are formed in the carrier core 3, channeling grooves 13 which extend substantially radially on the upper surface of the collar 5, to the flanged edge 6, and which further extend axially, in forming an angle, along said flanged edge 6, on the radially outer surface 6E of said flanged edge, as visible in particular in FIGS. 2, 3, 5, 8, 12 and 13.

As visible in particular in FIGS. 2, 5, 11, 12 and 13, (each of) the channeling grooves 13 may therefore extend from the hub 4 to the peripheral flanged edge 6, substantially along the entire radial extent R7F of the frontal layer 7F, that is to say more particularly, as mentioned above, (each of the channeling grooves) may occupy radially at least 25%, at least 30%, and preferably between 40% and 80%, of the total radial extent of the frontal surface of the carrier core 3 which is radially comprised between the radially inner wall of the bore of the hub 4 and the radially outer surface 6E of the flanged edge 6, and/or, in an alternative or equivalent manner, occupy radially at least 5%, at least 10%, at least 20%, and more particularly between 20% and 50%, for example between 25% and 35% of the overall radius of the completed wheel 1.

Advantageously, these channeling grooves 13 may fulfill a dual function.

First of all, during the coating step (b), said channeling grooves 13, which open at the apparent surface of the carrier core 3 which is intended to be overlaid by the coating layer 7, contribute to channeling, orientating and homogenizing the radial centrifugal flow of the second (liquid) material from the hub 4 to the flanged edge 6, and then along said flanged edge 6, which allows obtaining a proper distribution of the coating layer 7.

Afterwards, after cooling (hardening) of the coating layer 7, said channeling grooves 13 form, around the main axis (XX'), crenellated reliefs drowned in the coating layer 7, and therefore ensure a strong anchorage of said coating layer 7, thus improving the cohesion of the wheel in particular against the torques which are transmitted by said wheel 1, between on the one hand the hub 4 fastened to the shaft and belonging to the core 3 and on the other hand the meshing teeth 2 of the wheel rim 8 belonging to the coating layer 7.

Advantageously, in order to ensure an effective guidance of the flow of the second material until the flanged edge 6 inclusive, and more particularly in order to facilitate the second material flowing around the transition between the (radial) collar 5 and the (axial) flanged edge 6, the channeling grooves 13 include (from upstream to downstream of the flow) a frontal section 13F, which is dug in the collar 5 and which follows a substantially radial direction (either substantially horizontal or along a slope $\alpha_5$), and then a lateral section 13L which is dug in the flanged edge 6, and which follows a pathway substantially parallel to the main axis (XX'), wherein said sections 13F, 13L, which are thus arranged with an angle (substantially forming a «L» shape), are located in line one with the other and communicating with each other so as to generally form a continuous groove 13 which conforms to the (convex) contour of the carrier core 3.

Preferably, the channeling grooves 13 will be evenly distributed in a star-like fashion all around the main axis (XX'), as illustrated in FIG. 8, 11, 12 or 13.

As an indication, the width of each channeling groove 13 may be substantially comprised between 2 mm and 6 mm, and/or cover an angular sector $\theta_{13}$ comprised between 5 degrees and 15 degrees, and for example in the range of 7 degrees to 10 degrees, in azimuth (yaw) around the main axis (XX').

Preferably, the number of channeling grooves 13 will be larger than 12, and for example equal to 36, as illustrated in FIGS. 11 and 13.

As an indication, the depth P13 of the channeling grooves 13 (that is to say the depth through which each groove penetrates the surface of the collar 5, and then of the flanged edge 6), may be comprised between 1 mm and 3 mm.

Figure 14:
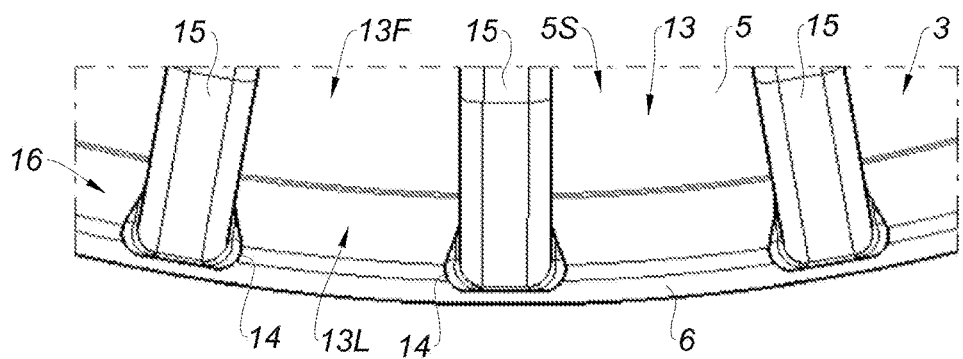
FIG. 14 illustrates, according to a partial top view, the detail of the channeling grooves dug in the carrier core, at the transition between the collar and the flanged edge.

Furthermore, the (axial) lateral sections 13L of the channeling grooves 13 which follow the flanged edge 6 preferably present, as visible in particular in FIG. 14, cross-sections with an anti pull-out constriction 14, such as dovetails, which reinforce the gripping of the wheel rim 8 on said flanged edge 6, in particular against the radial centrifugal forces.

Advantageously, the constrictions 14 may be formed by bulges of the partition walls 15 which separate respectively each channeling groove 13 from the neighboring channeling grooves 13.

In a cross-section according to a plane normal to the main axis (XX'), the cross-section of the considered lateral section(s) 13L may present any constricted shape, that is to say any shape with a shrinking of its opening on the outer surface 6E of the flanged edge, which will be functionally equivalent to a dovetail, for example a bulb-and-narrow-neck shape, a «T» shape, etc.

Advantageously, such cross-sections with a constriction 14 may be obtained by molding during the carrier core 3 realization step (a), and by using cores (or a male cavity) having a matched shape, wherein said cores are carried substantially along the main axis (XX'), which will advantageously correspond to the unmolding direction, and and wherein said cores are placed tangentially to the flanged edge 6, so that each of said cores imprints a lateral section 13L of a channeling groove in said flanged edge 6.

Preferably, during the carrier core 3 realization step (a), the transition area between the collar 5 and the flanged edge 6 is formed into a rounded edge 16, as well visible in particular in FIGS. 2 to 6, 11 and 12.

Preferably, the radius of curvature R16 of said rounded edge 16 is larger than or equal to 2 mm, and preferably smaller than or equal to 10 mm; said radius of curvature R16 will be, in a particularly preferred manner, substantially comprised between 2 mm and 6 mm.

Advantageously, a rounded edge 16 avoids the concentrations of stresses within the wheel, and therefore improves the resistance to breakage of said wheel 1.

Furthermore, this same rounded edge 16, which advantageously allows the channeling grooves 13 to form a curved angle, facilitates the flow of the second material during the coating step (b), and more particularly helps the second liquid material to flow around the junction between the collar 5 and the flanged edge 6, by facilitating the transition between radial flowing on the upper surface 5S of the collar and an axial flowing on the flanged edge 6.

Preferably, the carrier core realization step (a) comprises forming a plurality of reinforcing ribs 17 on the lower surface 5I of the collar 5, opposite to and axially below the upper surface 5S intended to receive the coating layer 7, wherein said plurality of reinforcing ribs 17 are disposed according to several azimuths around the main axis (XX'), that is to say distributed according to several yaw directions around said main axis (XX'), and wherein each of said reinforcing ribs 17 links the hub 4 to the lower surface 5I of the collar and to the radially inner surface 6I of the flanged edge 6, as well visible in particular in FIGS. 5, 6, 9, 10 and 15 to 20.

Advantageously, these reinforcing ribs 17 form substantially (or even perfectly) radial partition walls which prop up the collar 5 and the flanged edge 6 at the back of the carrier core 3, and more particularly which locally enlarge the axial thickness of the collar 5, in the concave (hidden) inner space of said carrier core 3 which is located axially opposite to the injection point of the second material with respect to the apparent upper surface 5S of the collar 5.

This allows the collar 5 and the flanged edge 6 to withstand, substantially without any deformation, the pressure exerted by the second material during the molding of the coating layer 7, while keeping a light hollow structure, in particular axially beneath the frontal coating layer 7F, because of the presence of empty cells 18 which angularly separate the reinforcing ribs 17 one from the other.

Figure 17:
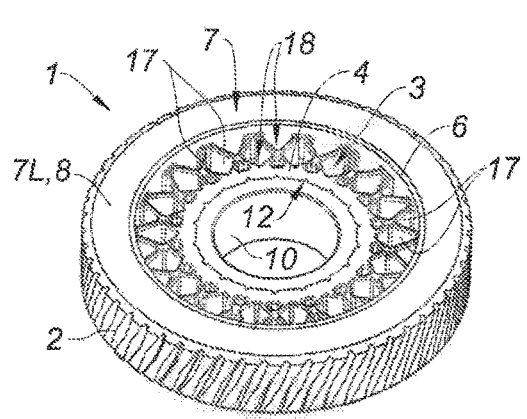
Figure 18:
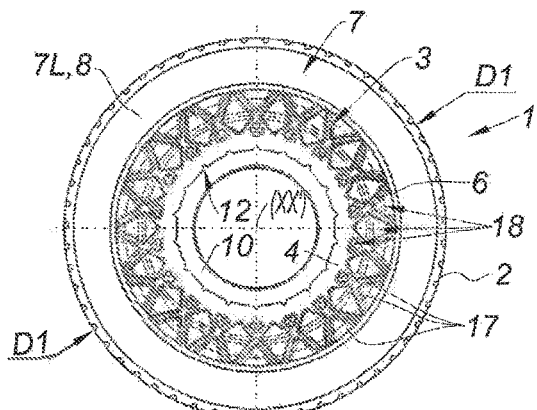

The reinforcing ribs 17 may present different shapes, rectilinear or incurved, without departing from the scope of the invention, and in particular they may follow a strictly radial star-like rectilinear arrangement around the main axis (XX'), as illustrated in FIGS. 9 and 10 or 19 and 20, or an incurved arrangement with arched feet (FIGS. 15 and 16) or even a cross-like rectilinear arrangement (FIGS. 17 and 18).

Figure 19:
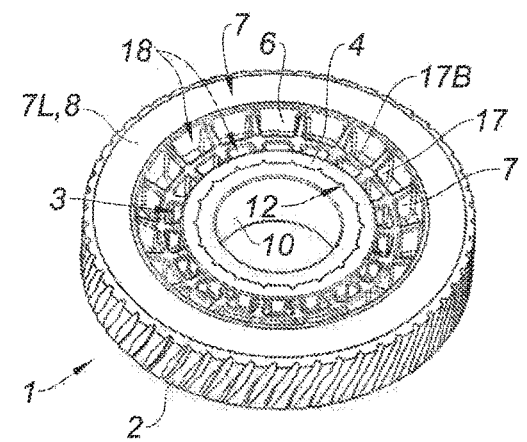
Figure 20:
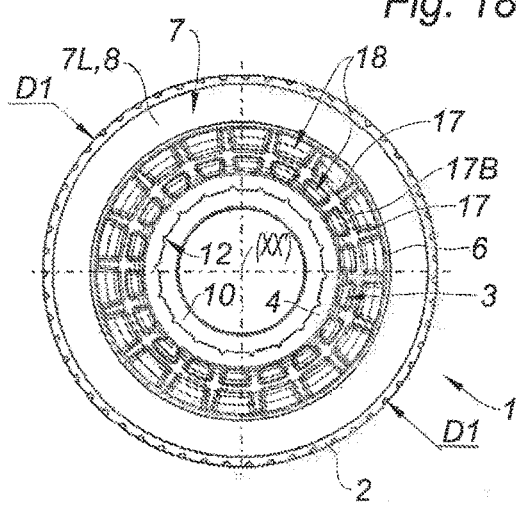

If appropriate, as illustrated in FIGS. 19 and 20, an annular rib 17B for intermediate circling, centered on the main axis (XX'), may ensure a junction between the different radial reinforcing ribs 17, in the hollow interval radially comprised between the hub 4 and the radially inner (distinct) surface 6I of the flanged edge 6.

Advantageously, both for convenience of manufacture and for improving the solidity of the carrier core 3, the reinforcing ribs 17, 17B will be made of one piece with the rest of the carrier core 3, during the step (a) of realizing said carrier core 3 by (over)molding.

Moreover, preferably, during the carrier core realization step (a), the upper surface 5S of the collar 5 is formed axially set-back with respect to the corresponding end, called «upper end» 4S, of the hub 4, so as to form a shoulder 20 between the upper end 4S of the hub and the upper surface 5S of the collar, as visible in particular in FIGS. 2, 5 and 12.

Consequently, during the coating step (b), the frontal coating layer 7F may preferably and advantageously come into contact with said shoulder 20, as is visible in particular in FIG. 3.

Figure 4:
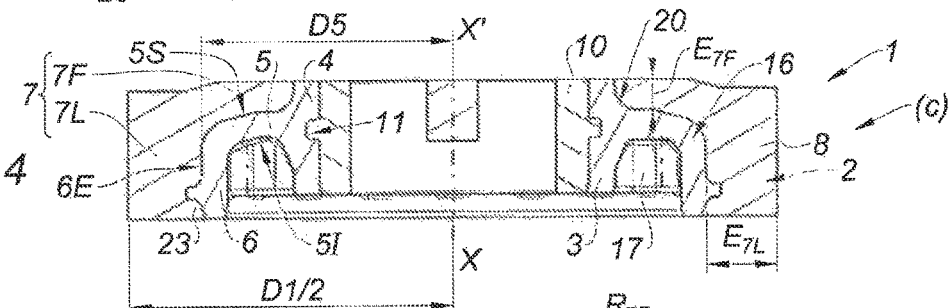

Advantageously, subsequently to the coating step (b), it will thus be possible to keep, on the completed wheel 1, and as shown in particular in FIGS. 4, 6 and 8, an at least partial filling of said shoulder 20 with said frontal layer 7F having a non-zero axial thickness $E_{7F}$, preferably so that said frontal layer 7F flushes axially with the upper end 4S of the hub 4 (thus, the frontal layer 7 fills the volume axially comprised between the upper surface 5S of the collar and the upper end of the hub 4, wherein said upper end of the hub is here the end of the hub that is the closest to said upper surface 5S).

Advantageously, the use of the hub 4 as a reference for molding and/or as a reference for re-machining the coating layer 7 simplifies the manufacture of said coating layer.

Indeed, it is possible for example, during the coating step (b), either to place, in the mold, a central core intended to fill in the bore of the hub 4, and more particularly a core filling in the bore of the sleeve 10, or to directly use the shaft of the wheel 1 as a core, and then inject at the upper end 4S of the hub the second polymer material intended to form the coating layer 7, so as to fill the shoulder 20 (without any risk that the second polymer material overflows in the bore of the hub 4, since said bore is occupied and therefore protected by the core).

As illustrated in FIG. 3, the injection F of the second polymer material will preferably be carried out substantially in a central position, facing the center of the hub 4, that is to say along the main axis (XX'), so as to form (on the upper surface 4S of the hub and on the upper face of the core which seals said hub) a ring gate (diaphragm) 21 from which the second liquid material will spread out over the surface of the collar 5 and then over the surface of the flanged edge 6.

Thanks to the ring gate 21, substantially flat, and normal to the main axis (XX'), it is possible to benefit from a relatively wide material injection surface, which will limit the shear and self-heating phenomena of the injection point that would otherwise be likely to degrade the quality of the second material, and more particularly the tenacity of said second material (indeed, the shear tends to break the polymer chains, thus deteriorating the viscosity and the tenacity of the considered polymer, in particular when said polymer consists of a polyamide).

Thus, it is possible to obtain a homogenous and effective covering of the carrier core 3 by a particularly robust second material.

Afterwards, it is possible to provide for a finishing step (c) (FIG. 4) during which the ring gate 21 is eliminated by leveling, for example by milling, so as to obtain a residual frontal layer 7F which flushes axially with the upper end 4S of the hub (which in turn is located, if appropriate, in the same plane, normal to the main axis (XX'), as the upper end of the sleeve 10).

Such a manufacturing method advantageously allows obtaining a completed wheel 1 which is compact and solid in a few steps, and while consuming very little material (since the volume lost by leveling the ring gate 21 is particularly reduced).

Moreover, preferably, during the carrier core realization step (a), a radially recessed cut-out 22 is formed, such as an indentation or an annular groove, at the free end of the flanged edge 6, located axially opposite to the collar, as visible in particular in FIGS. 2, 5, 6 and 12.

Thus, during the coating step (b), it is possibly to carry on covering of the flanged edge 6 with the second polymer material until filling said radially recessed cut-out 22, thereby forming a bearing rim 23 made of one piece with the lateral coating layer 7L, so that the carrier core 3 is axially blocked in both directions within the coating layer 7 by catching said carrier core 3 between two abutments formed on the one hand by the frontal layer 7F and on the other hand by the bearing rim 23, as visible in particular in FIGS. 3 and 6.

If appropriate, the cut-out 22 may be axially in continuity with a protruding annular flange 24 which marks the end of the channeling groove 13 (and more particularly the end of the lateral section 13L thereof) on the flanged edge 6, as illustrated in particular in FIG. 5.

Accordingly, the bearing rim 23 will then form a radially inward flange with a substantially matching shape, which engages below said protruding annular flange 24.

Still, it will be noted that said protruding annular flange 24 may contribute to rigidify the flanged edge 6 radially beneath the meshing teeth 2, so that the wheel 1 could better resist the deformations under the meshing stress, such as oval-making deformations.

Moreover, during the carrier core realization step (a), a textured structure is preferably conferred to the upper surface 5S of the collar 5 and/or to the radially outer surface 6E of the flanged edge 6, wherein said textured structure presents textural reliefs (not represented), such as ridges, the depth of which is preferably substantially comprised between 0.1 mm and 0.5 mm.

Advantageously, it will then be possible, during the coating step (b), to cause (relatively easily) the superficial melting of said textural reliefs so as to improve the adherence of the coating layer 7 on the carrier core 3.

Advantageously, the presence of thin textural reliefs (in particular, less deep than the channeling grooves 13), which slightly disturb the flow of the second material to the surface of the core 3, and which are subjected more easily than the rest of the collar 5 to heating, and which are therefore more likely to exceed the glass transition temperature of the first material than the rest of the collar 5, enables the second material constitutive of the coating layer 7 to mix more easily with the first material constitutive of the core 3, and therefore improve the anchorage of the coating layer 7 on the core 3 at the interface between the two materials.

Advantageously, as said above, part of the energy that is necessary for heating the carrier core 3 may originate from the re-using during the coating step (b), while still hot, a portion of the mold which has already been used for manufacturing the carrier core 3 during step (a).

The invention also concerns, as such, a carrier core 3 allowing and facilitating the implementation of a method according to the invention.

Hence, the invention relates to an (annular) carrier core 3 made of a (first) polymer material, which comprises, preferably in one piece, a hub 4 with a main axis (XX'), a collar 5 which extends substantially radially from said hub 4, away from the main axis (XX'), up to a peripheral flanged edge 6 the junction of which with said collar 5 forms a rounded edge 16, wherein said carrier core 3 further presents channeling grooves 13 dug in (and opening on) the upper surface 5S of the collar and then in the radially outer surface 6E of the flanged edge 6, so that said channeling grooves 13 extend substantially radially on the upper surface 5S of the collar 5, to the flanged edge, and further extend axially, in forming an angle, along said flanged edge 6, on the radially outer surface 6E of said flanged edge 6.

The invention also concerns, as such, a toothed wheel 1 obtained by a method according to either one of the described features, and therefore presenting either one of the corresponding structural features.

Finally, the invention is in no way limited to the sole variants described in the foregoing, those skilled in the art being in particular capable of freely isolating or combining together either one of the aforementioned features, or substituting them with equivalents.

The invention claimed is:

1. A method for manufacturing a toothed wheel, said method comprising:
a carrier core manufacturing step (a), during which a carrier core is made of a first polymer material, said carrier core including a hub with a main axis, as well as a collar which extends substantially radially from said hub, away from the main axis, up to a peripheral flanged edge said collar being delimited axially by an upper surface orientated on the side axially opposite to the flanged edge and by a lower surface axially orientated on the side of the flanged edge, and
a coating step (b) during which is carried out by overmolding on the carrier core in a second polymer material, a permanent coating layer which remains permanently on the completed toothed wheel said coating layer comprising in one piece (i) a frontal layer which covers the upper surface of the collar as an axial over-thickness of said collar and (ii) a lateral layer which axially extends said frontal layer by covering the radially outer surface of the flanged edge as a radial over-thickness of said flanged edge, so that said lateral layer forms a wheel rim in the radial thickness of which meshing teeth of the wheel are formed,
wherein, during the carrier core manufacturing step (a), channeling grooves are formed in the carrier core, wherein the channeling grooves extend substantially radially on the upper surface of the collar, from the hub up to the flanged edge, and further extend axially, in forming an angle, along said flanged edge on the radially outer surface of said flanged edge.

2. The method according to claim 1, wherein the lateral sections of the channeling grooves which follow the flanged edge present cross-sections with an anti pull-out constriction, which reinforce the gripping of the wheel rim on said flanged edge.

3. The method according to claim 2, wherein, during the carrier core manufacturing step (a), the transition area between the collar and the flanged edge is formed according to a rounded edge, a radius of curvature of which is between 2 mm and 6 mm.

4. The method according to claim 3, wherein, during the carrier core manufacturing step (a), a plurality of reinforcing ribs are formed on the lower surface of the collar, opposite to and axially below the upper surface intended to receive the coating layer, the plurality of reinforcing ribs disposed according to several azimuths around the main axis, and each linking the hub to the lower surface of the collar and to the radially inner surface of the flanged edge.

5. The method according to claim 4, wherein, during the carrier core manufacturing step (a), the hub, the collar and the flanged edge are made of one piece, by forming the carrier core by an overmolding operation, on a metallic connecting sleeve, intended to be press-fitted on a shaft or directly on the ultimate support shaft of the toothed wheel.

6. The method according to claim 5, wherein, during the carrier core manufacturing step (a), the upper surface of the collar is formed axially set-back with respect to a corresponding upper end of the hub so as to form a shoulder between the upper end of the hub and the upper surface of the collar, in that, during the coating step (b), the frontal coating layer comes in contact with said shoulder, and in that, subsequently to the coating step (b), an at least partial filling of said shoulder with said frontal layer having a non-zero axial thickness is kept, on the completed wheel.

7. The method according to claim 6, wherein, during the carrier core manufacturing step (a), a radially recessed cut-out is formed, at the free end of the flanged edge, located axially opposite to the collar, and wherein during the coating step (b) covering the flanged edge with the second polymer material is carried on until filling said radially recessed cut-out, thereby forming a bearing rim made of one piece with the lateral layer, so that the carrier core is axially blocked in both directions within the coating layer by catching said carrier core between two abutments formed by the frontal layer and by the bearing rim.

8. The method according to claim 7, wherein, during the carrier core manufacturing step (a), a textured structure is conferred to the upper surface of the collar and/or to the radially outer surface of the flanged edge, wherein said textured structure presents textural reliefs the depth between 0.1 mm and 0.5 mm, and in that, during the coating step (b), the superficial melting of said textural reliefs is caused so as to improve the adherence of the coating layer on the carrier core.

9. The method according to claim 8, wherein the first polymer material is distinct from the second polymer material and presents a higher rigidity than a rigidity of said second polymer material, due to addition of reinforcing fibers.

* * * * *